(12) United States Patent
Gretz

(10) Patent No.: US 6,740,813 B1
(45) Date of Patent: May 25, 2004

(54) COVER FOR CEILING-MOUNTED ELECTRICAL OUTLET

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/154,687

(22) Filed: May 24, 2002

(51) Int. Cl.[7] .................................................. H05K 5/03
(52) U.S. Cl. .................... 174/66; D13/152; 248/906; 220/241; 33/528; 33/DIG. 10
(58) Field of Search ................ 174/66; D13/152; 248/906; 220/241; 33/528, DIG. 10

(56) References Cited

U.S. PATENT DOCUMENTS

| | | | | | |
|---|---|---|---|---|---|
| 3,859,454 A | * | 1/1975 | Mann | ........................... | 174/66 |
| 5,072,848 A | * | 12/1991 | Pipis et al. | .................... | 174/66 |
| 5,683,460 A | * | 11/1997 | Persoons | ..................... | 606/60 |
| 5,931,425 A | * | 8/1999 | Oliva | ...................... | 248/200.1 |
| 6,005,190 A | * | 12/1999 | Stark et al. | ................... | 174/66 |
| 6,152,273 A | * | 11/2000 | Kilkenny | ..................... | 191/58 |
| 6,152,413 A | * | 11/2000 | Gretz | ........................ | 174/50 |
| D438,175 S | * | 2/2001 | Stark et al. | ................ | D13/152 |

* cited by examiner

Primary Examiner—Dean A. Reichard
Assistant Examiner—Anton Harris

(57) ABSTRACT

A cover and bracket are provided for covering ceiling junction box openings in which there are no visible connecting devices on the face or outer surface of the cover. The cover has an inner surface and an outer surface. A peg is connected to the inner surface of the cover and includes raised ribs at an angle to the outer periphery of the cover. The bracket is adapted for connection to a junction box with connectors such as bolts or screws, and has one or more central engagement openings which are sized and shaped to selectively receive and engage the peg such that the cover holds fast to the junction box and covers the junction box opening and some portion of the surrounding ceiling surface. In a preferred embodiment, there are two central engagement openings. A first engagement opening contains spring engagement tabs that provide frictional holding of the peg. A second engagement opening is of a diameter less than the peg and ribs allowing the cover to be rotated clockwise therein. The central engagement openings may be elongated to permit inversion of the bracket for installation over junction boxes that are recessed into the ceiling.

2 Claims, 5 Drawing Sheets

COVER FOR CEILING-MOUNTED ELECTRICAL OUTLET

FIELD OF THE INVENTION

This invention relates to covers and closures, and more particularly, to covers of electrical outlets and junction boxes.

BACKGROUND OF THE INVENTION

Homebuilders typically cover ceiling-mounted junction boxes immediately after installation to allow house buyers the opportunity to later select a ceiling-mounted device according to their own taste. This is often due to the wide variety of lights and fans and combinations available in many styles and sizes for ceiling installation. Earlier covers were usually of the cup or pie plate type. Such prior art covers were typically attached to the junction box using a bracket and screws. This prior art bracket included a threaded hole in its center, and a short length of small diameter threaded pipe threaded into the threaded hole in the bracket. The prior art cover included a hole in its center which was sized to receive the pipe. A decorative cap nut, in this prior art arrangement, was used to engage the protruding pipe and secured the prior art cover to the junction box.

Such prior art covers, although perhaps effective at covering the junction box, were highly visible and, to some, marred the appearance of the ceiling. The cap nut, although made in decorative finish, remained visible after installation of the prior art cover. Later, flat cover plates were developed to maintain a low profile when attached to the ceiling, thereby being less noticeable. The flat prior art cover plates were usually held in place against the ceiling by flat headed bolts that were screwed into threaded holes of a bracket. This type of prior art cover was an improvement over the earlier version in that it was less noticeable, however, the heads of the securing bolts had to be painted to match the cover and the surrounding ceiling. During installation of this type of cover, it was common for the installer to mar the surface of the cover while tightening the bolts (or screws) of the cover. The paint frequently chipped, making the cover visible and distracting. The cover of this type usually required "touch-up" with paint after the cover had been installed. It is characteristic of prior art covers that no matter how small or decorative, the connecting mechanism is always visible and apparent.

In U.S. Pat. No. 6,005,190 (hereinafter the '190 patent), the present applicant for invention provided a decorative cover that overcame some of the deficiencies of prior art covers. This patent provided a cover that attached to a junction box and obscured the view of the box while at the same time eliminating the use of any protruding fasteners that would detract from the appearance of the cover. The cover of the '190 patent was adaptable for covering junction boxes which were level with the surrounding ceiling and also for covering cover junction boxes recessed within a ceiling.

Although the '190 patent provided a cover with many improvements over the prior art, the cover was still not optimal when used on a ceiling with an uneven or roughly textured surface.

It is therefore an object of the invention to provide a cover for electrical junction boxes which combines the pleasant appearance of the cover of the '190 patent with an ability to cover junction boxes mounted within uneven or rough textured ceilings.

It is another object of the invention to provide such a cover, which attaches to a junction box in a manner that fasteners are hidden from view.

SUMMARY OF THE INVENTION

A cover plate for a ceiling-mounted electrical-junction box includes an inner surface and an outer surface. A peg is connected to the inner surface and extends generally perpendicularly therefrom a predetermined distance. According to a first embodiment, the peg includes raised ribs along its side. The ribs are angled with respect to the rim of the cover. A bracket is sized and shaped to be secured to the junction box, and includes two peg-engagement openings. The peg-engagement openings are sized and shaped to selectively receive and engage the ribs of the peg so that the cover holds fast to the bracket and covers the junction box opening and some portion of the surrounding ceiling.

The first of the peg-engagement openings preferably includes flexible tabs that support the peg and engage the ribs of the peg as it is pushed into the engagement opening. A second peg-engagement opening preferably is of a smaller diameter than the peg and ribs such that clockwise rotation of the cover will cause it to be pulled tightly into the opening. The first peg-engagement opening provides a quick push-in type connection mechanism that is appropriate for applying the cover to junction boxes within smooth surrounding walls. The second peg-engagement opening provides a means for securing the cover to junction boxes within uneven surrounding walls or roughly textured walls.

REFERENCE NUMERALS USED IN THE SPECIFICATION AND DRAWINGS

20—cover plate
22—inner surface
24—outer surface
26—perimeter surface
28—center point 30—rim
32—beveled edge
34—peg
36—axis
38—remote end (of peg)
40—tapered surface
42—side surface
44—raised ribs
46—peak (of rib)
50—bracket
52—fasteners
54—elongated body
56—longitudinal axis
58—opposing ends
60—center portion
62—strengthening ribs
66—first peg-engagement assembly
68—second peg-engagement assembly
70—outer pair of openings
72—inner pair of openings
74a—first side of elongated body
74b—second side of elongated body
76—ring-shaped perimeter wall
78—central opening (first peg-engagement assembly)
80—engagement tab
82—arcuate path
84—remote end (of tab)
86—arcuate edge (of tab)
88—circular opening
90—central opening (second peg-engagement assembly)
92—circular perimeter wall
94—grooves
96—electrical junction box
98—wall or ceiling structure
100—opening of junction box
102—apertures
104—lower rim (of junction box)

DETAILED DESCRIPTION OF THE INVENTION

Figure 1:
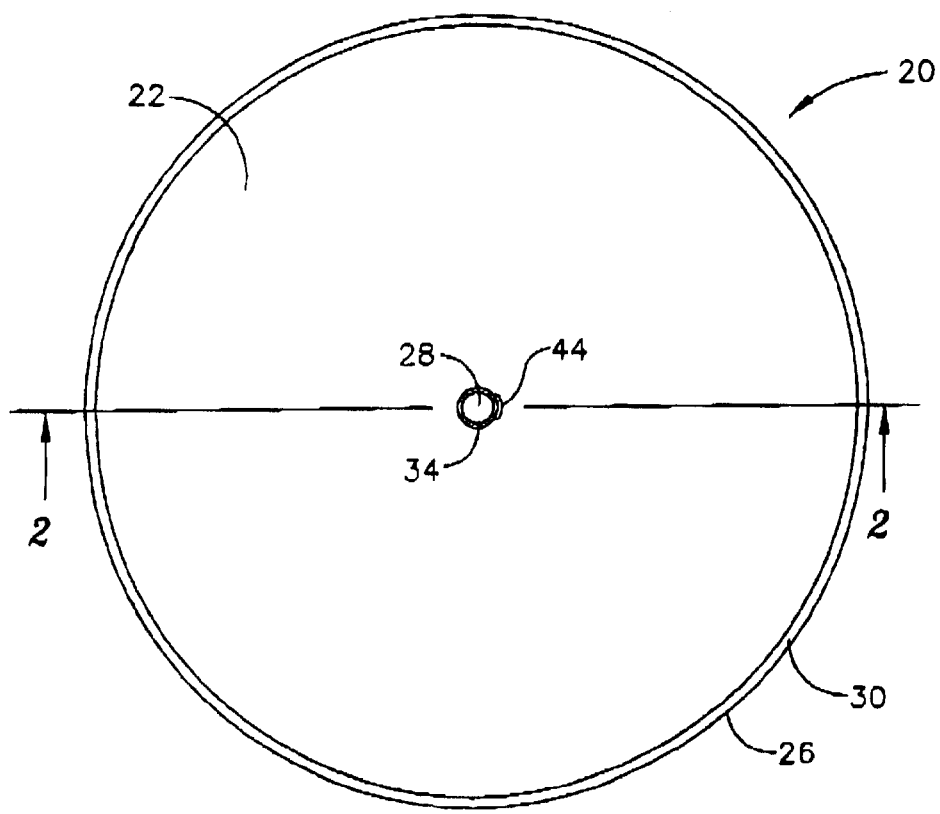
FIG. 1 is a top plan view of a preferred embodiment of a round, flat cover plate according to the present invention.
Figure 2:
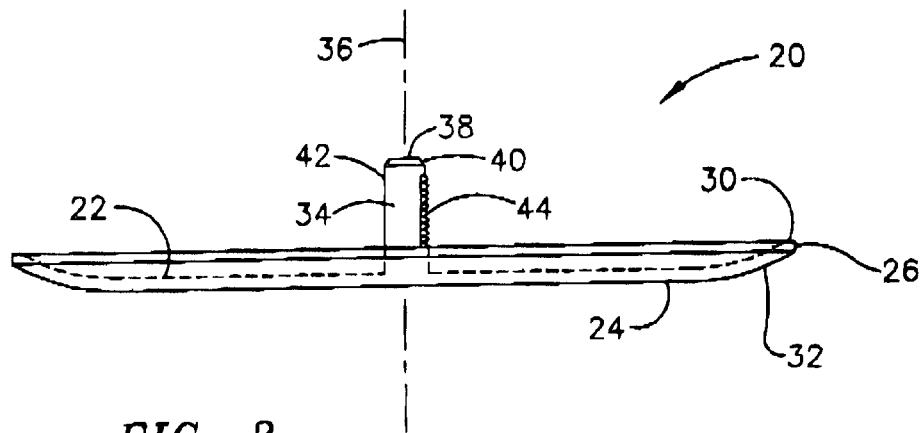
FIG. 2 is a side view of the cover plate of FIG. 1.

Referring to FIGS. 1 and 2, a flat cover plate 20 is shown defining an inner surface 22, an outer surface 24, a perimeter surface 26, a center point 28, and a rim 30. It is preferred in this embodiment, that perimeter surface 26 and outer surface 24 meets with a beveled edge 32, as shown, and that cover plate 20 is made from plastic. A peg or pin (hereinafter called "peg") 34 is attached to inner surface 22, extending generally perpendicularly from cover plate 20, as shown in FIG. 2, along an axis 36. Peg 34 is preferably integrally formed with cover plate 20 and is positioned at center point 28. Peg 34 includes a remote end 38 that has a tapered surface 40, and a side surface 42. Although peg 34 may have any cross-sectional shape without departing from the gist of the invention, it is preferred that peg 34 have a generally circular cross-section, centered along axis 36.

Figure 3:
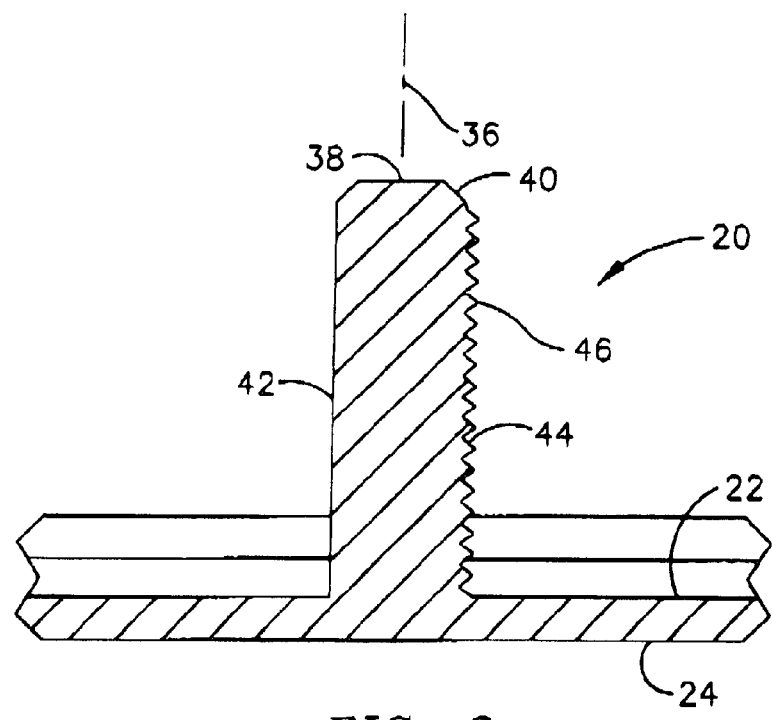
FIG. 3 is a partial sectional view of the cover plate of FIG. 1 showing in detail the ribbed peg, according to the invention.

Referring to FIGS. 1–3, located along side surface 42 of peg 34 are a set of raised ribs 44 which extend in a longitudinal strip along the side of the peg 34. Each raised rib of ribs 44 preferably extends circumferentially about side surface 42 less than 90 arc degrees, as illustrated in FIG. 1, and protrudes a predetermined distance beyond the circular cross-sectional shape of peg 34, as shown in FIG. 3. However, ribs 44 may have any shape and may extend circumferentially about side surface 42 greater than 90 degrees (including 360 arc degrees). Each raised rib 44 is preferably triangular in cross-section, as shown in FIG. 3 and the peak 46 of each rib 44 preferably extends 0.02 inch beyond the side surface 42 of the peg 34. There are preferably twenty-five ribs 44 per inch along the side surface 42. These dimensions of the ribs 44 are for illustrative purposes only as the size and the ribs per unit length of peg can be varied without departing from the scope of the invention.

Figure 5:
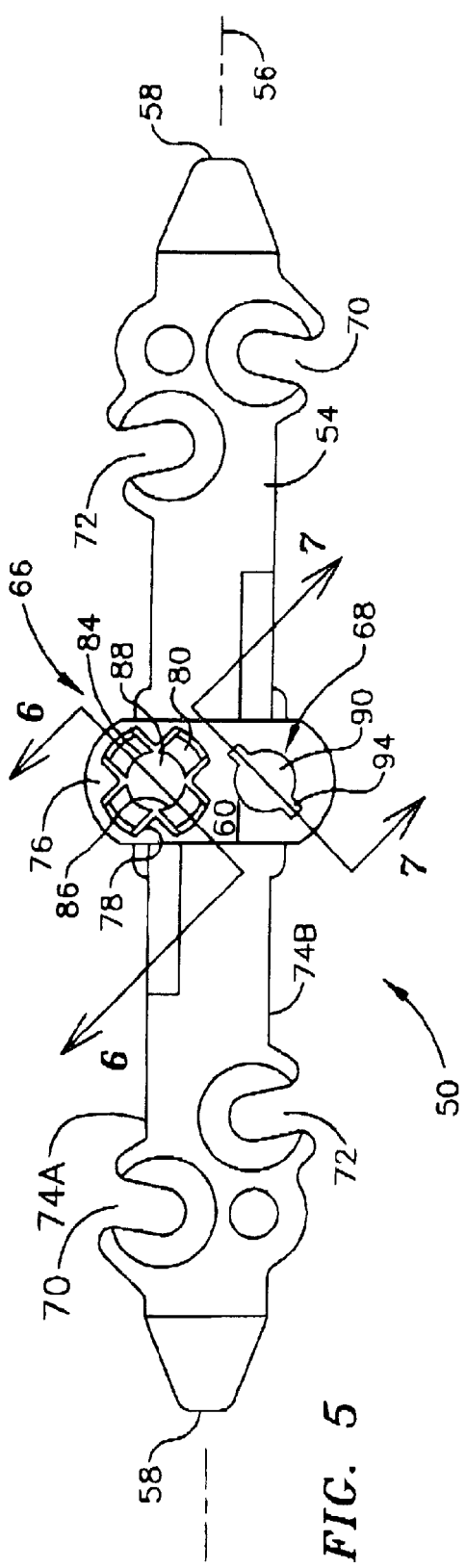
FIG. 5 is a top plan view of a preferred embodiment of the connecting bracket according to the present invention.

A bracket 50, according to a preferred embodiment of the invention, is shown in FIG. 5 and is used to secure cover plate 20 to a junction box (not shown). Bracket 50 is secured to the junction box using fasteners 52 (shown in FIGS. 8 and 9). Bracket 50 includes an elongated body 54 defining a longitudinal axis 56, two opposing ends 58 and a wide center portion 60. Bracket 50 is preferably made from a strong resilient plastic, as detailed below and is appropriately reinforced with integrally molded ribs 62, and bosses 64 as those skilled in the art would appreciate. Located at the center portion 60, and preferably integrally formed with body 54 are first 66 and second 68 peg-engagement assemblies. Located near each opposing end 58 and along longitudinal axis 56 is an outer pair of openings 70 having a width (measured transverse to longitudinal axis 56) slightly greater than the shaft diameter of the fastening screws 52 (see FIG. 8). An inner pair of openings 72 are provided on the elongated body 54 and are located farther from the opposing ends 58 of the bracket 50 than the outer pair 70. As depicted in FIG. 5, each of the openings in the outer pair of openings 70 are located on opposite sides 74a, 74b of the elongated body 54 in the preferred embodiment of the bracket 50. Likewise, each of the openings in the inner pair of openings 72 are located on opposite sides 74a, 74b of the elongated body 54 in the preferred embodiment of the bracket 50.

Referring again to FIG. 5, the first peg-engagement assembly 66 includes a ring-shaped perimeter wall 76 defining a central opening 78, and radially-inwardly directed engagement tabs 80. Tabs 80 are preferably integrally formed with elongated body 54 and are generally coplanar with body 54. There are preferably four such tabs 80 that are preferably equally spaced at 90 arc degree intervals within wall 76 so that, as described below, at least one tab 80 will engage with raised ribs 44 when peg 34 (not shown) is inserted into bracket 50. Tabs 80 are molded in such a manner to provide a spring-like resiliency to each tab while maintaining its structural integrity, perhaps using conventional plastic-injection molding techniques known by those skilled in the art. In this arrangement, each tab 80 is resiliently displaceable along an arcuate path 82, illustrated for one tab 80 in FIG. 6.

Figure 6:
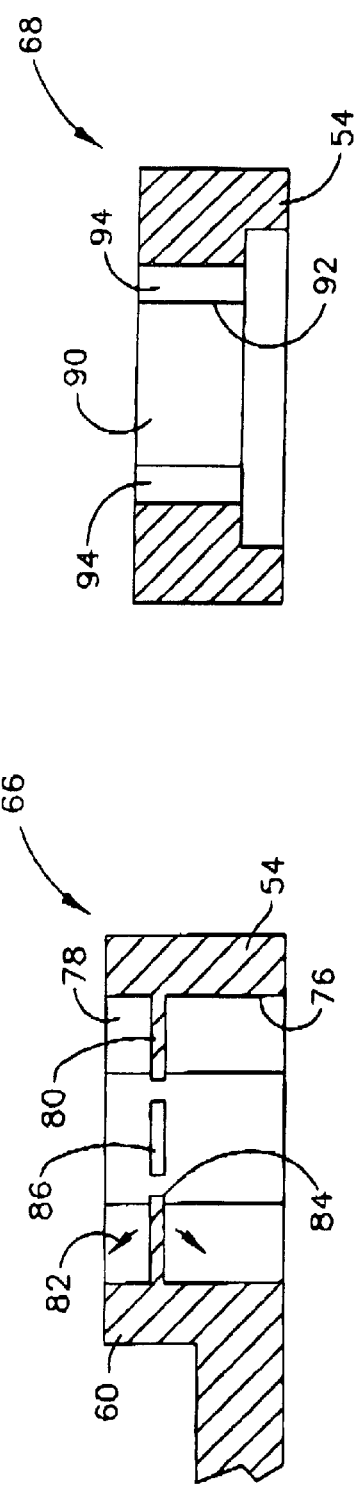
FIG. 6 is a partial sectional view of the connecting bracket taken along line 6—6 of FIG. 5 showing details of the first peg-engagement opening.

Referring to FIGS. 5 and 6, each tab 80 in the first peg-engagement assembly 66 includes a remote end 84 that is generally adjacent to center portion 60 and includes an arcuate edge 86 so that collectively the four tabs 80 define a circular opening 88 located at center portion 60. Remote end 84 of each tab 80 is preferably formed as an arc having essentially the same radius as peg 34 so that the contact between each tab 80 and peg 34 is maximized. Circular opening 88 has an effective diameter that is at least equal to, and preferably smaller than the diameter of peg 34.

Figure 8:
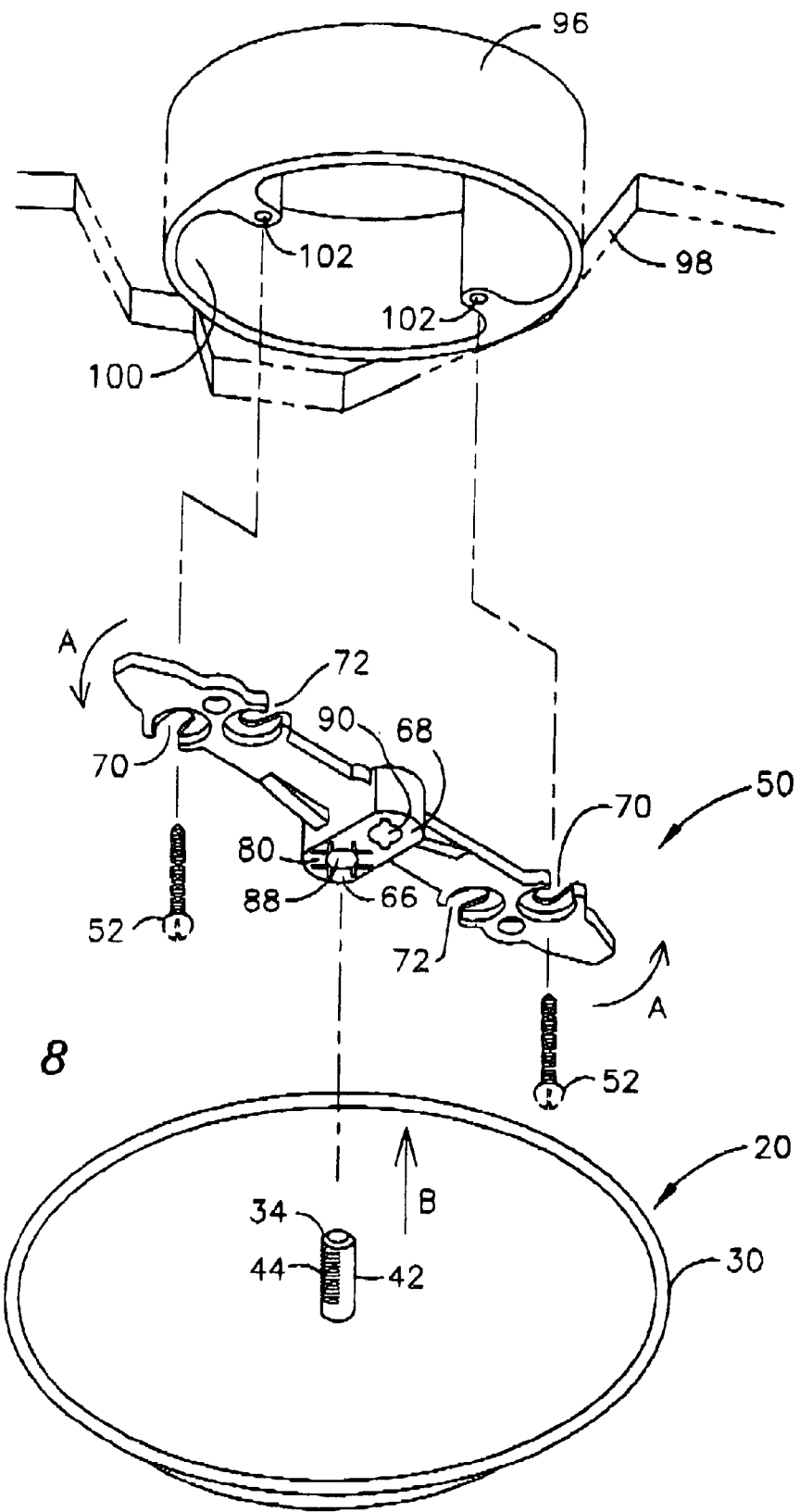
FIG. 8 is an exploded perspective view of the preferred embodiment of the invention including the bracket in alignment to be secured to a junction box through outer openings and the cover plate in alignment to be secured to the first peg-engagement opening in the bracket.

Referring to FIG. 8, peg 34 of the cover 20 must be sufficiently rigid and strong to be pushed though the circular opening 88 of the first peg-engagement assembly 66 and deflect the tabs 80 sufficiently such that they hold the peg 34 of the cover plate 20 secure.

Figure 7:
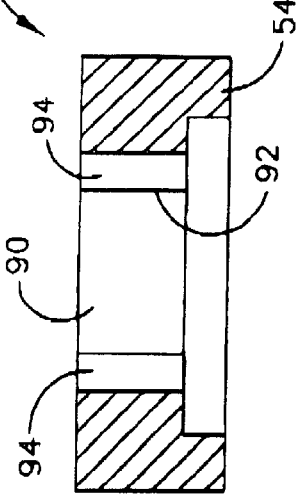
FIG. 7 is a partial sectional view of the connecting bracket taken along line 7—7 of FIG. 5 showing details of the second peg-engagement opening.

With reference to FIGS. 5 and 7, the second peg-engagement assembly 68 includes a central opening 90 including a circular perimeter wall 92 and two grooves 94 cut preferably along the entire length of the perimeter wall 92. The central opening 90 of the second peg-engagement assembly 68 is of a diameter smaller than the width of the peg 34 and raised ribs 44 combined (not shown).

As explained below, the cover plate may be used in conjunction with either the first or second peg-engagement assembly to secure the cover to an electrical junction box. The first peg-engagement assembly is typically used when the surrounding ceiling surface is smooth and provides a means of quickly and easily pushing the cover plate onto the box. The second peg-engagement assembly provides a means of screwing the cover into the box. The second peg-engagement assembly pulls the cover toward the ceiling and provides a tighter fit to the box which is typically needed when the ceiling is uneven or has a rough-textured finish.

FIG. 8 illustrates operation of the invention using the first peg-engagement assembly 66. As shown in FIG. 8, an electrical junction box 96 is typically mounted within a wall or ceiling structure 98 so that the opening 100 of the junction box 96 is exposed through the structure 98. A user first examines the apertures 102 in the junction box 96 to determine whether the outer 70 or inner 72 pair of openings will be used for affixing the bracket thereto. FIG. 8 depicts a junction box 96 in which the apertures 102 are of a spacing equal to the spacing between the outer pair of openings 70. Bracket 50 is therefore first secured to junction box 96 using fasteners 52 that pass through the outer 70 pair of openings. The design of the openings 70 provides an easy means of connecting the bracket 50 to the junction box 96. Typically an installer would screw the fasteners 52 partially into the apertures of the junction box 96. The bracket 50 is then brought into contact with the surrounding ceiling surface 98 and rotated in the direction shown by arrows "a" to seat the openings against the fasteners 52. The fasteners 52 are then tightened thereby securing the bracket 50 to the box 96. With the bracket 50 secured to the box 96, the circular opening 88 of the first peg-engagement assembly 66 and the central opening 90 of the second peg-engagement assembly 68 are positioned very near the center of the junction box opening 100. As depicted in FIG. 8, the cover plate 20 is then pushed in the direction shown by arrow "b" until the peg 34 enters the central opening 78 of the first peg-engagement assembly 66 and the raised ribs 44 on the peg 34 engage one or more of the tabs 80. As peg 34 passes through central opening 78, at least one resilient tab 80 flexes along arcuate path 82 (FIG. 6) to accommodate raised ribs 44. The remaining tabs 80 function to guide and support peg 34 and may also provide frictional engagement with side surface 42 of peg 34, or other raised ribs 44. Peg 34 is advanced into central opening 78 until cover plate 20 abuts the surface of structure 98 (e.g., the ceiling). The resilient nature of cover plate 20 and engagement tabs 80 allow slight deformation of cover plate 20 upon insertion so that cover plate is tightly drawn against the surface of structure 98.

The frictional engagement between raised ribs 44 and tabs 80 is sufficient to hold cover plate 20 tightly against the surface of structure 98, yet easily overcome through prying should it be necessary to remove cover plate 20 from junction box 96 without damaging tabs 80. Cover plate 20 may be re-installed following the steps listed above.

Figure 4:
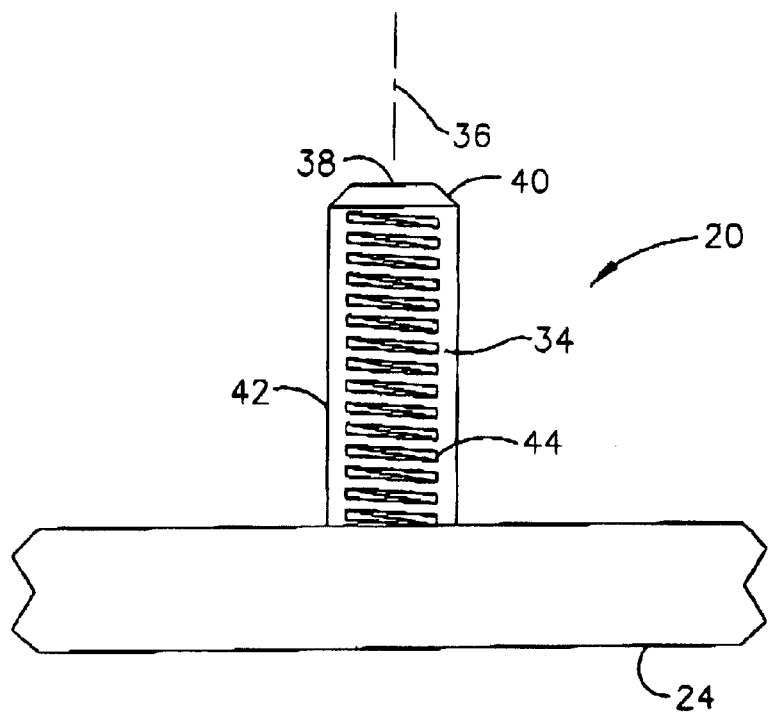
FIG. 4 is a partial side view of the cover plate of FIG. 1.
Figure 9:
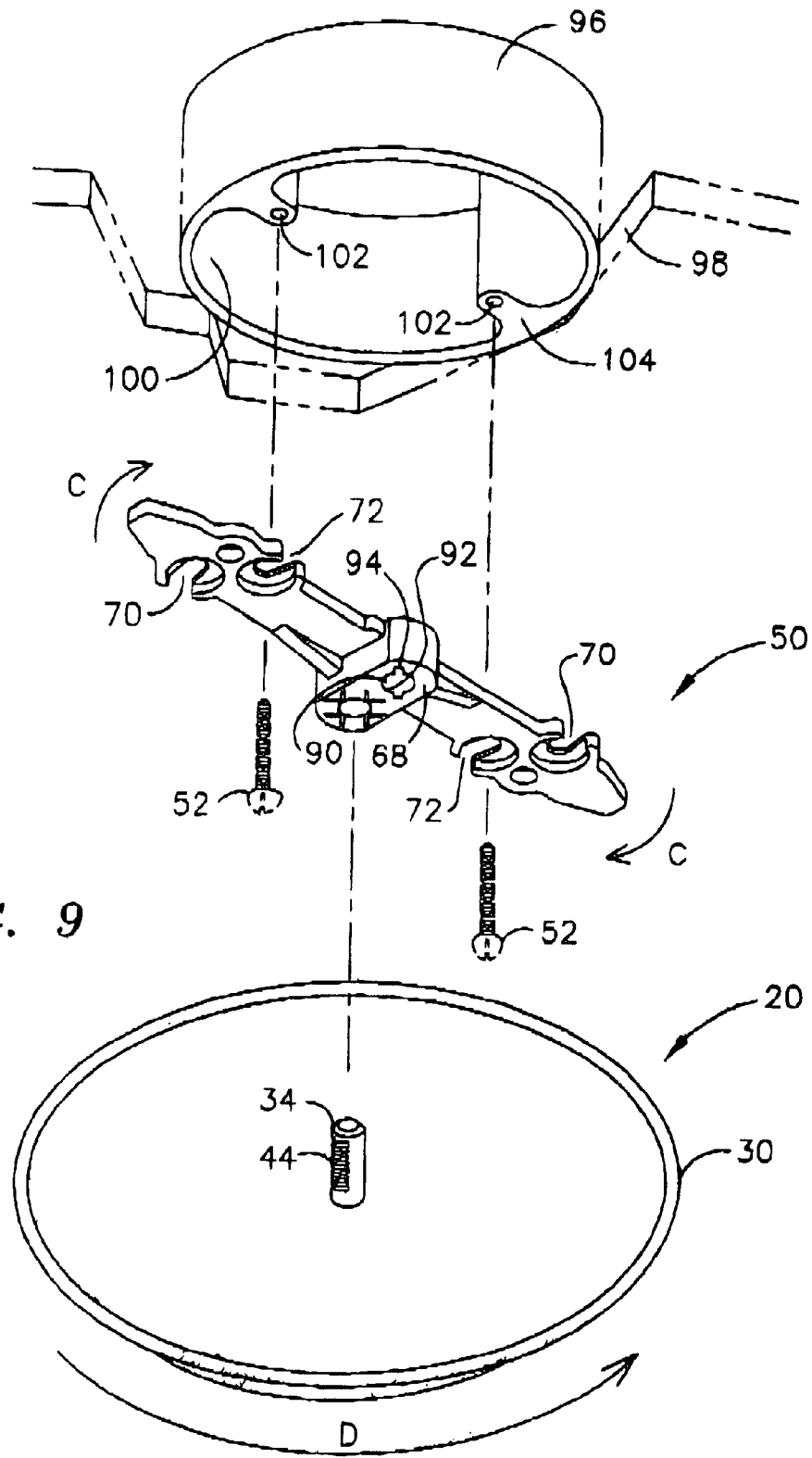
FIG. 9 is an exploded perspective view of the preferred embodiment of the invention including the bracket in alignment to be secured to a junction box through inner openings and the cover plate in alignment to be secured to the second peg-engagement opening in the bracket.

Operation of the invention using the second peg-engagement assembly 68 to secure the cover to a junction box is illustrated in FIG. 9. Apertures 102 injunction box 96 are spaced a shorter distance apart than the apertures shown in FIG. 8. In this instance, the inner pair of openings 72 is used to secure the bracket 50 to the junction box 96. Similar to use of the outer pair of openings, the fasteners 52 may first be partially inserted into the apertures 102. Bracket 50 may then be placed against the lower rim 104 of junction box 96 and rotated in the direction of arrow "c" in FIG. 9 to align the bracket 50 properly with the inner pair of openings 72. Once bracket 50 is secured to the box 96, the second peg-engagement assembly 68 is positioned near the center of the box 96. Peg 34 of cover plate 20 may then be inserted into the central opening 90 in the second peg-engagement assembly 68 and cover 20 rotated in the direction of arrow "d" in FIG. 9 to cause the peg 34 and the raised ribs 44 to enter the central opening 90. Raised ribs 44 are preferably at an angle sloping from left to right (FIG. 4). Therefore, as peg 34 of cover plate 20 is rotated clockwise as shown in FIG. 9, since central opening 90 is of a smaller diameter than the diameter of the raised ribs 44 and peg 34, raised ribs 44 bite into the circular perimeter wall 92 (FIG. 7) of the second peg-engagement assembly 68 and cause cover plate 20 to be drawn toward the secured bracket 50. Grooves 94 in the circular perimeter wall 92 assist raised ribs 44 in obtaining a bite within the second peg-engagement assembly. Cover plate 20 may then be rotated clockwise as far as desired by the installer. Typically an installer would rotate cover plate 20 until the rim 30 of the cover plate contacted the surrounding ceiling structure 98. Since the second peg-engagement assembly 68 pulls the peg 34 and cover plate 20 upward, cover plate 20 can be fastened until the rim 30 of the cover contacts the ceiling structure 98, creating a very attractive and unobtrusive cover for the junction box. As a result of the second peg-engagement assembly 68 being very nearly centered on the junction box 96, and since the typical outer diameter of the cover plate is 5.4 inches and the typical maximum diameter of a ceiling junction box is 4.1 inches, the cover plate 20 typically extends well beyond the junction box 96 to enable the cover plate 20 to obstruct view of the entire box 96 and any breaks in the ceiling structure 98 around the box. The overall length of the bracket 50 is typically 5.1 inches, which enables the bracket 50 to span the electrical junction box 96 and some of the surrounding ceiling structure 98. Therefore, if the ceiling structure 98 is uneven or of a roughly textured finish, the bracket 50 will contact the ceiling structure 98 and enable the cover plate 20 to be secured tightly against the structure. Since the bracket 50 spans the box 96 and contacts the ceiling structure 98, the bracket 50 and cover plate 20 of the present invention may be used in those situations in which the junction box 96 is recessed within the ceiling structure 98.

The cover plate is preferably made from a relatively rigid plastic and the ribbed peg is typically constructed of the same plastic and is formed as part of the cover plate. While any rigid thermoplastic polymer can be used, it is preferred that the thermoplastic be suitable for injection molding. Illustrative of thermoplastic polymers which can be used are polyvinyl chloride, polyamides, polyethylene, polypropylene, polystyrene, polyethylene terephthalate, polycarbonate and the like. Copolymers can also be employed as can suitable monomers. Polyvinyl chloride is the preferred polymer because of its functional properties and relative ease of manufacture.

Since it is usually desired to have the cover plate blend in with the ceiling it is preferred that the polymer be formulated to contain fillers and pigments which approximate the color of the ceiling (painted). A common color of ceilings is white or off-white. Other ingredients may be incorporated into the polymer formulation such as stabilizers, lubricants and the like.

The connecting bracket is also made from thermoplastic and can also be made by injection molding. While any of the polymers recited above can be employed, it is not necessary that bracket 50 be any particular color.

As noted above it is desirable that the face of cover plate 20 blend in with the ceiling for the same reason it is desirable that the face of cover plate 20 be embossed or etched with a finely detailed textured surface (such as a matte finish) to eliminate gloss, or reflective or high glare, which would stand out against the ceiling. The embossed surface can be created by texturing to the surface of the mold used in the injection molding process. The texture should be unobtrusive and help the cover blend with the ceiling.

It is desirable that the dimensions of the cover plate 20 should be sufficiently large to cover the junction box in the ceiling, the bracket, and some portion of the surrounding ceiling structure 98. Frequently the junction box opening is cut somewhat oversize and for this reason some overlap should be provided. Additionally, different size junction boxes require different size openings. Accordingly, different size cover plates should be provided for different size junction boxes. It has been found that a cover plate of about 5.4 inches is satisfactory for the 4-inch opening on a standard junction box and is the preferred size for this box. It can of course be larger.

Peg 34 preferably has a diameter of 0.25 inch. Raised ribs 44 preferably extend beyond the side surface 42 of peg 34 by about 0.020 inch. In the first peg-engagement assembly 66, a central opening 78 of about 0.24 inch is preferable and has proven to be satisfactory for tightly receiving a ribbed peg of the cited dimensions. Ribs 44 are preferably relatively fine so that the distance between the ribs is small and a tighter fit against the ceiling may be achieved. Ribs 44 having a count of about 25 to the inch have been found to be satisfactory, but other sized ribs and rib spacing could be used. For the second peg-engagement assembly 68, the central opening 90 is preferably 0.250 inch in diameter to receive and engage the typical 0.265-inch outer diameter across the peg 34 and raised ribs 44. The raised ribs 44 are preferably at an about a 15° angle with respect to the rim 30 of the cover plate 20.

While the foregoing dimensions are preferred, they can of course be varied, provided the resultant peg 34 is easily pushed into the first peg-engagement assembly 66 and tightly held therein or easily rotated into the second peg-engagement assembly 68 and pulled tightly therein, as described above.

The length of peg 34 must be sufficient that it can pass through central opening 78 and contact engagement tabs 80 of the first peg-engagement assembly 66 or pass through central opening 90 and contact circular perimeter wall 92 of the second peg-engagement assembly 68. For a flat cover plate, it has been found that a peg of about 0.81 inch in length is satisfactory. The present invention may be applied to a variety of different shaped cover plates, including flat (as described above and shown in FIGS. 1–2, saucer shaped, or a deep saucer shape, such as a cup shape (not shown). The distance between the inner surface and the rim of the cover plate increases in the saucer shape and the cup shape plates. In such versions, the length of peg 34 must be sufficiently long to extend beyond the inner surface of the cover plate and reach the peg-engagement assemblies 66, 68.

From the foregoing description, one skilled in the art can easily ascertain the essential characteristics of this invention, and without departing from the spirit and scope thereof, make various changes and modifications of the invention to adapt it to various usages and conditions. It is therefore intended that the scope of the invention be limited only by the scope of the appended claims.

What is claimed is:

1. A cover for mounted electrical box which obscures any view of said mounted electrical box and any fasteners associated therewith comprising:

an elongated bracket including two ends and a center portion;

an opening on said bracket near said ends;

said pair of openings capable of aligning with apertures in a said mounted electrical box for attachment thereto;

said ends of said bracket extending beyond the walls of said mounted electrical box;

a cover including an outer periphery sized larger than said bracket and having an inner and outer surface, and a rim;

a peg extending from said inner surface of said cover;

a plurality of raised ribs extending from the side of said peg, said ribs at an angle with respect to said rim of said cover;

two peg-engagement openings in said center portion of said bracket;

a first of said peg-engagement openings adapted to engage said peg and said raised ribs frictionally when said peg is pushed therein; and a second of said peg-engagement openings of a smaller size than the size of said peg and said raised ribs, said second of said peg-engagement openings adapted to engage said peg and said raised ribs by threading when said peg is rotated therein, whereby engagement of said peg with either of said first or said second peg-engagement openings enables said cover to be used in such a manner that said mounted electrical box, any fasteners associated with said mounted electrical box, and any portion of an opening formed in the wall to accommodate said mounted electrical box are obscured from visibility.

2. The cover of claim 1 wherein said second of said peg-engagement openings includes grooves to assist said raised ribs in obtaining a bite when said peg is inserted and rotated therein.

* * * * *